(12) United States Patent
Sonnek et al.

(10) Patent No.: US 9,003,408 B2
(45) Date of Patent: Apr. 7, 2015

(54) PROVIDING VIRTUAL MACHINE SERVICES BY ISOLATED VIRTUAL MACHINES

(71) Applicant: Adventium Enterprises, Minneapolis, MN (US)

(72) Inventors: Jason D. Sonnek, Lino Lakes, MN (US); Steven A. Harp, Coon Rapids, MN (US); J. Thomas Haigh, Golden Valley, MN (US)

(73) Assignee: Adventium Enterprises, Minneapolis, MN (US)

( * ) Notice: Subject to any disclaimer, the term of this patent is extended or adjusted under 35 U.S.C. 154(b) by 266 days.

(21) Appl. No.: 13/631,122

(22) Filed: Sep. 28, 2012

(65) Prior Publication Data

US 2014/0096131 A1    Apr. 3, 2014

(51) Int. Cl.
*G06F 9/455* (2006.01)
*G06F 21/53* (2013.01)

(52) U.S. Cl.
CPC ..................................... *G06F 21/53* (2013.01)

(58) Field of Classification Search
None
See application file for complete search history.

(56) References Cited

U.S. PATENT DOCUMENTS

| | | | |
|---|---|---|---|
| 7,797,748 B2 | 9/2010 | Zheng et al. | |
| 7,984,304 B1 | 7/2011 | Waldspurger et al. | |
| 2007/0234337 A1* | 10/2007 | Suzuki et al. | 717/168 |
| 2008/0320594 A1 | 12/2008 | Jiang | |
| 2009/0089879 A1 | 4/2009 | Wang et al. | |
| 2010/0251238 A1 | 9/2010 | Schuba et al. | |
| 2012/0054741 A1* | 3/2012 | Ali et al. | 718/1 |
| 2012/0324236 A1* | 12/2012 | Srivastava et al. | 713/189 |
| 2013/0298244 A1* | 11/2013 | Kumar et al. | 726/25 |

OTHER PUBLICATIONS

Payne et al. (Secure and Flexible Monitoring of Virtual Machine 2007, hereinafter Payne).*
Dalton et al. (Trusted Virtual Platforms: A Key Enabler for Converged Client Devices Jan. 2009, hereinafter Dalton).*
International Search Report and Written Opinion for related PCT Application No. PCT/US2013/062196, dated Mar. 18, 2014, 15 pages.
Pfoh, et al., "A Formal Model for Virtual Machine Introspection", Proceedings of the 2nd ACM Workshop on Virtual Machine Security, VMSec'09, Chicago, Illinois, USA, Nov. 2009, 9 pages.
Unknown., "Hypervisor" Retrieved from http://en.wikipedia.org/wiki/Hypervisor, May 21, 2012, 1 page.
Payne, et al., "Lares: An Architecture for Secure Active Monitoring Using Virtualization", IEEE Symposium on Security and Privacy, Oakland, CA, USA, May 18-22, 2008, 15 pages.

(Continued)

*Primary Examiner* — Emerson Puente
*Assistant Examiner* — Sisley Kim
(74) *Attorney, Agent, or Firm* — Brooks, Cameron & Huebsch, PLLC (57) ABSTRACT

The present disclosure includes methods and systems for providing virtual machine services. A number of embodiments can include a user VM with a virtual workstation, a number of service modules that can provide a number of services without communicating with the user VM and/or the virtual workstation, a communication channel that allows the number of service modules to communicate with each other, a computing device, and a manager. A number of embodiments can also include a virtual machine monitor to enforce an isolation policy within the system.

15 Claims, 4 Drawing Sheets

(56) References Cited

OTHER PUBLICATIONS

Garfinkel, et al., "A Virtual Introspection Based on Architecture for Intrusion Detection", Network and Distributed System Security Symposium, Feb. 2003, 16 pages.
Sonnek, et al., "Starling: Minimizing Communication Overhead in Virtualized Computing Platforms Using Decentralized Affinity-Aware Migration", Dec. 2, 2009, 16 pages.
Fraser, et al., "VICI—Virtual Machine Introspection for Cognitive Immunity", 2008 Annual Computer Security Applications Conference, Anaheim, CA, USA, Dec. 8-12, 2008, pp. 87-96.
Nance, et al., "Investigating the Implications of Virtual Machine Introspection for Digital Forensics", 2009 International Conference on Availability, Reliability and Security, Mar. 16-19, 2009, pp. 1024-1029.
Nance, et al., "Virtual Machine Introspection: Observation or Interference?", IEEE Computer Society, Security and Privacy, Sep.-Oct. 2008, pp. 32-37.
Unknown., "VMware vShield: Virtualization-Aware Security for the Cloud", 2010, 4 pages.
Unknown., "VMware vShield App: Protect Applications from Network-based Attacks", 2010, 2 pages.
Unknown., "VMware vShield Edge: Secure the Edge of the Datacenter", 2010, 2 pages.
Unknown., "VMware vShield Endpoint: Endpoint Security for Virtual Datacenters", 2010, 2 pages.
Jiang, et al., "Stealthy Malware Detection Through VMM-Based "Out-of-the-Box" Semantic View Reconstruction", 14th ACM Conference on Computer and Communications Security, CCS'07, Alexandria, VA, USA, Oct. 29-Nov. 2, 2007, 11 pages.
Wood, et al., Black-box and Gray-box Strategies for Virtual Machine Migration, Proceedings of the 4th USENIX Conference on Networked Systems Design and Implementation, NSDI'07, Cambridge, MA, USA, Apr. 11-13, 2007, 14 pages.
Unknown., "Citrix XenClient 1.0 Proof of Concept Implementation Guide", Jun. 2010, 52 pages.
Payne, et al., "Secure and Flexible Monitoring of Virtual Machines", 23rd Annual Computer Security Applications Conference, 2007, ACSAC 2007, Dec. 1, 2007, pp. 385-397.
Ortiz, C. Enrique., "Understanding security on Android", Retrieved from the Internet: http://www.ibm.com/developerworks/library/x-androidsecurity/x-androidsecurity-pdf.pdf, Retrieved on Jan. 20, 2014, Published Nov. 16, 2010, pp. 1-20.
Partial Search Results for corresponding PCT Application No. PCT/US2013/062196, dated Feb. 5, 2014, 6 pages.

* cited by examiner

PROVIDING VIRTUAL MACHINE SERVICES BY ISOLATED VIRTUAL MACHINES

GOVERNMENT RIGHTS

The subject matter of this disclosure was made with Government support under Agreement FA8750-10-D-0197 awarded by the Air Force. Accordingly, the U.S. Government has certain rights to subject matter disclosed herein.

BACKGROUND

A virtual machine (VM) that can be used by a user can have a number of security issues. For example, a VM can be exposed to malware among other security threats. Malware can harm computational operations and can gain access to sensitive information that can be used to harm a user, for instance. Malware can reproduce itself and can spread from one computer system to a number of other computer systems. Computer systems can become infected by malware, which may be installed knowingly or unknowingly by a user.

DETAILED DESCRIPTION

The present disclosure includes methods and systems for providing virtual machine services. A number of embodiments can include providing a user virtual machine (VM) having access to a number of virtual resources. A number of embodiments can also include providing a number of service VMs having a number of service modules that provide a number of services to the user VM by accessing the number of virtual resources. A number of embodiments can also include isolating the user VM from the number of service VMs through a virtual machine monitor that prevents communication between the user VM and the number of service VMs.

A number of embodiments can include instructions stored on a computer readable medium which are executed by a processor to provide virtual machine services as described herein. As one example, instructions stored on a computer readable medium can be executed by a processor to provide a communication channel within a computing device. Instructions stored on a computer readable medium can be executed by a processor to provide a number of service VMs having a number of service modules that are part of the communication channel. Instructions stored on a computer readable medium can be executed by a processor to deliver a number of messages through the communication channel between the number of service modules, wherein the number of messages are delivered in response to detecting abnormal behavior that is associated with a user VM. Instructions stored on a computer readable medium can be executed by a processor to perform a number of services by the number of service modules through an introspection library without communicating with the user VM, wherein the number of services are performed for the user VM which is isolated from the communication channel, the number of service modules, and the number of service VMs.

A number of embodiments can provide benefits such as enhanced security relative to previous VM environments. Furthermore, a number of embodiments can provide benefits such as an infrastructure that can allow a number of service VMs to provide a number of services. A number of embodiments can also provide benefits such as allowing a number of sets of third party computer readable instructions (CRI) from different vendors to be used within the same infrastructure.

In the following detailed description of the present disclosure, reference is made to the accompanying drawings that form a part hereof, and in which are shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 210 may reference element "10" in FIG. 2, and a similar element may be referenced as 310 in FIG. 3. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate the embodiments of the present invention, and should not be taken in a limiting sense. Also, as used herein "a number of" something can refer to one or more of such things.

Various embodiments of the present disclosure can be performed by execution of CRI (e.g., in the form of software and/or firmware), hardware, application modules, and the like, executable and/or resident on the tools, systems, and devices shown herein or otherwise. As used herein, a virtual machine monitor (e.g., hypervisor) refers to CRI (e.g., software) that provide virtualization support for a number of virtual machines (VMs). A VM can operate as a standalone computing device (e.g., with an operating system, applications, etc.) except that it runs in a virtualized environment provided by the virtual machine monitor. A virtual machine monitor itself may require a privileged VM to emulate hardware and firmware calls for the unprivileged VMs. The privileged VM can provide interfaces to virtual hardware devices that the virtual machine monitor can export to unprivileged VMs. The privileged VM can translate operations on these virtual hardware devices to operations on shared physical hardware devices. This privileged VM can have a "privileged" view of the internal operation of the unprivileged VMs. A VM can operate as a standalone computer, (e.g., with an operating system, applications, etc.) except that it runs in the virtualized environment provided by the virtual machine monitor.

A VM can have virtual system hardware and guest CRI. The virtual system hardware can include at least one virtual central processing unit (CPU), virtual memory, and a number of virtual storage devices. The guest VM can include a guest Operating System (OS) and a number of drivers as needed for the various virtual storage devices. As used herein, the term guest can make reference to components that are part of a VM. For example, a host platform (e.g., computing device) can include an OS that can be referred to as a host OS and a VM can include an OS that can be referred to as a guest OS.

A VM can operate on a computing device under its own context, which can be provided by a virtual machine monitor. A context of a VM can include the state of virtual address space, as well as a set of registers, for example. A context of a VM can also include the state of a number of virtual storage devices.

A number of VMs can operate on a computing device while being isolated from each other. The number of VMs can share resources from a computing device even though a number of VMs can remain isolated from each other. For example, executable files can be accessed by a guest OS from a virtual disk and/or virtual memory which can be mapped to portions of the physical disk (e.g., host disk) or physical memory (e.g., host memory) respectively. The allocation of physical disk space and/or physical memory can be determined by a virtual machine monitor.

Figure 1:
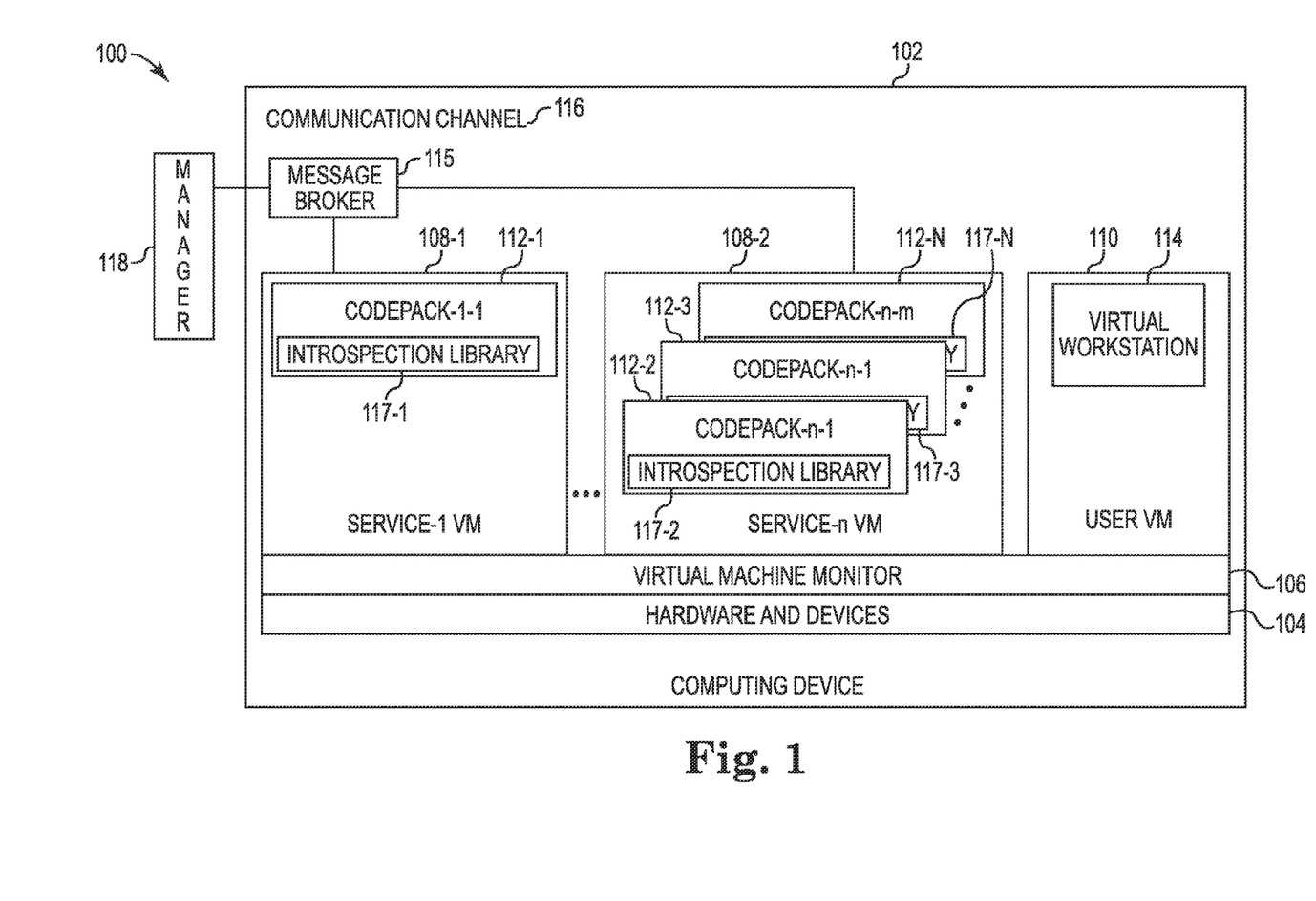
FIG. 1 illustrates a system for providing VM services in accordance with a number of embodiments of the present disclosure.

FIG. 1 illustrates a system 100 for providing VM services in accordance with a number of embodiments of the present disclosure. In the example shown in FIG. 1, the system 100 includes a computing device 102 in communication with a manager 118 via a communication channel 116.

The computing device 102 can support a number of users to accomplish various tasks through a number of applications, for example. The computing device 102 can support a number of users directly, indirectly, and/or remotely. The computing device 102 can be a computer system, which can include a number of hardware resources 104 and/or devices attached thereto. Hardware resources 104 and/or devices can include physical memory, a display, disk drives, USB devices or USB peripherals, and/or network interface cards, among others.

In a number of embodiments, a virtual machine monitor 106 can provide a number of VMs with shared access to the hardware resources 104. The virtual machine monitor 106 can be a native (e.g., bare metal) virtual machine monitor and/or a hosted virtual machine monitor. A native virtual machine monitor can include, for example, a virtual machine monitor that runs directly on the hardware resources 104. A hosted virtual machine monitor can include, for example, a virtual machine monitor that runs within an OS environment. A native virtual machine monitor can have a smaller attack surface than a hosted virtual machine monitor. A virtual machine monitor can use hardware virtualization support that can assist in separating a number of VMs that run within the environment created by the virtual machine monitor. In a number of embodiments of the present disclosure, a native virtual machine monitor and/or a hosted virtual machine monitor can be used to support a number of VMs.

In a number of embodiments, the virtual machine monitor 106 can support different VM types. For example, as shown in FIG. 1, the virtual machine monitor 106 can support a user VM 110 and a number of service VMs 108-1, 108-2 (e.g., referred to generally as 108). The user VM 110 can be a guest VM that can contain a virtual workstation 114. Although one user VM 110 and one virtual workstation 114 are shown in FIG. 1, a number of user VMs can be supported by computing device 102 and a number of virtual workstations can be contained by user VM 110. The user VM 110 and/or the virtual workstation 114 can include services and/or functions that support a number of users. As used herein, a user can include a human user and/or an automated user. The user VM 110 and/or the virtual workstation 114 can provide user services and/or functions through a guest OS and/or software programs.

The communication channel 116 can include a messaging infrastructure and message schema. For example, the communication channel 116 can include a virtual network. The communication channel 116 can, for example, facilitate delivery of messages between a number of service modules which can be referred to as codepacks 112-1, 112-2, 112-3, . . . , 112-N and/or between the number of codepacks 112-1, 112-2, 112-3, . . . , 112-N and the manager 118. The various codepacks 112-1, 112-2, 112-3, . . . , 112-N may be collectively referred to as 112.

The communication channel 116 can be configured to restrict communication between the codepacks 112 and a number of external networks. The restrictions can prevent communication between a number of codepacks 112 and the user VM 110 and/or a virtual workstation 114. In a number of embodiments of the present disclosure, the restrictions can prevent the user VM 110 and virtual workstation 114 from being aware of the existence of the number of codepacks 112 by preventing the user VM 110 and the virtual workstation 114 from communicating with (e.g., "seeing") the number of codepacks 112. In a number of embodiments of the present disclosure, communications between the number of codepacks 112 can be invisible to the virtual workstation 114 and user VM 110. The communication channel 116 can be configured with the above restrictions through virtual machine monitor 106, for example.

The manager 118 can include a privileged VM that manages the operations of the number of codepacks 112 and the service VMs 108. The manager 118 can dynamically install and/or remove the number of codepacks 112, establish and maintain configurations associated with the number of codepacks 112, and manage communications between the number of codepacks 112 (e.g., via communication channel 116) to support collaborative and orchestrated operations (e.g., between and/or among the codepacks 112). The manager 118 can also provide a user interface to a system administrator such that the system administrator can manage the number of codepacks 112. The manager 118 can support a number of codepacks 112 that can be located in a single computing device 102 and/or a number of additional computing devices (not shown). In a number of embodiments, codepacks 112 can provide a number of services to a number of virtual workstations and a number of user VMs running on a number of computing devices.

In a number of embodiments of the present disclosure, the number of codepacks 112 can communicate with each other through communication channel 116 by sending messages to coordinate their activities and/or adjust their policies. The number of messages can pass through a message broker 115 that can restrict communication patterns. For example, a communication pattern can include a number of messages that can be sent from one of the number of codepacks 112 to another codepack (e.g., orchestration codepack). In such embodiments, the orchestration VM can be a service VM (e.g., 108-1) that orchestrates the services provided to a user VM (e.g., 110). The message broker 115 that restricts access to the communication channel 116 based on an identification assigned to each of the number of service modules by an authentication mechanism. The message broker 115 can keep a log of a number of messages that pass through the message broker 115 and can provide the log to a system administrator (e.g., by making the log available to the manager 118 through communication channel 116). A message broker 115 can be hosted in a number of locations that enables it to be connected to the communication channel 116.

As used herein, a message can include a request and/or a response, among other communications. For example, a first message can include a request that a first codepack 112-1 can provide to a second codepack 112-2 and a second message can include a response that the second codepack 112-2 can provide to the first codepack 112-1. In a number of embodiments, a message can be an alert. For example, a message can be an alert that a first codepack 112-1 can send to a number of other codepacks 112. The alert can include, for instance, a notification that a change has occurred and/or that a security threat has been detected, among other types of alerts. A number of messages can be sent in response to the detection of abnormal behavior that is associated with a user VM 110 and/or virtual workstation 114. Abnormal behavior can include behavior by the user VM 110 and/or virtual workstation 114 that indicates that a security threat exists in the user VM 110 and/or virtual workstation 114.

Access to a message broker 115 can be based on an authentication mechanism. An authentication mechanism can be used to uniquely identify each of the codepacks and an associated security policy. For example, an authentication mechanism can include a number of certificates that can be assigned to the number of codepacks 112. A policy that is associated with the number of certificates can determine which messages a given codepack 112 is allowed to send and/or receive. Each computing device (e.g., 102) can have a message broker 115, and a number of message brokers in different computing devices can communicate through a communication channel (e.g., 116). The message broker 115 can distribute a number of messages through a message queue that can be persistent such that the messages can survive a number of failures.

The number of service VMs 108 can be guest VMs that can be containers for the number of codepacks 112 that can provide CRI for providing services to the user VM 110 and/or virtual workstation 114. A service VM 108 can provide a guest OS on which a number of codepacks 112 can execute. In a number of embodiments of the present disclosure, a number of service VMs 108 can be invisible to the user VM 110.

The codepacks 112 can include CRI (e.g., code) executed to provide a number of services, directly or indirectly, to user VM 110 and/or virtual workstation 114. In a number of embodiments of the present disclosure, the number of services provided by codepack 112 can include security related services. For example, the number of services can include a virus scan service and/or firewall service, among others. The number of services can also include services supporting robust operations of the user VM 110 and/or the virtual workstation 114. The codepacks 112 can have a number of different permissions and/or privileges depending on the services provided, for instance. For example, a virtual machine monitor 106 can grant a first codepack 112-1 a number of privileges that can allow the first codepack 112-1 access to a virtual storage device associated with virtual workstation 114 and/or user VM 110.

A service VM 108 can be a private service VM and/or a shared service VM. For example, a private service VM can include a codepack (e.g., 112-1) that is assigned to a service VM (e.g., 108-1). A shared service VM can include a codepack (e.g., 112-2) that shares the service VM (e.g., 108-2) with a number of codepacks (e.g., 112-3, . . . , 112-N).

In a number of embodiments of the present disclosure, the CRI that can be included in the number of codepacks 112 can include sets of third party CRI from various different sources (e.g., vendors). For example, a first codepack (e.g., 112-1) can include a first set of CRI, from a first source, that provide a number of services to user VM 110 and/or virtual workstation 114 while a second codepack (e.g., 112-2) can include a second set of CRI, from a second source, that provide a number of services to the user VM 110 and/or virtual workstation 114. That is, CRI from a number of different sources can be used to provide a number of services through the number of codepacks 112 regardless of an OS that can be executing on virtual workstation 114. Furthermore, CRI from a number of different sources can be used even if the CRI have not been configured to communicate with virtual workstation 114 and/or user VM 110.

A number of the codepacks 112 can provide an infrastructure for a number of sets of third party CRIs to perform a number of services for user VM 110 and/or virtual workstation 114. The infrastructure can include a communication channel 116 that includes a number of service VMs 108 and a number of codepacks 112, but does not include a user VM 110. That is, communication channel 116 allows direct communication between manager 118, and service VMs 108, but does not allow direct communication between manager 118 and user VM 110 and/or between service VMs 108 and user VM 110. The infrastructure 116 can also be used to provide the number of services. For example, a third party set of CRI designed to perform a number of services from within user VM 110 and/or virtual workstation 114 can perform the services through communication channel 116 and through an introspection library (e.g., 117) from outside the user VM 110 and/or a virtual workstation 114 without having to modify the third party CRI's design. An introspection library will be described further herein below.

The codepacks 112 can include CRI that can be executed to perform an intended (e.g., designated) particular function (e.g., scan for malware, filter traffic, etc.). In a number of embodiments, the codepacks 112 can be executed to perform the particular functions independently and/or through an introspection library 117. The codepacks 112 can also include items such as a requirements declaration, a certificate, a management policy, a security policy, and/or a baseline configuration, among other items. A requirements declaration can, for example, describe the resources required by the codepack to perform a number of particular services. A description of the resources required by the codepack can include an optimal description and a minimal description, among others. An optimal description can, for example, describe the resources that a codepack requires to perform the number of particular services at an optimal level. A minimal description can, for example, describe the resources that a codepack needs to perform a minimum number of services and/or to perform the number of particular services at a minimal level. Resources required by a codepack can include a service VM type (e.g., private or shared), OS preferences, and/or memory requirements, among others.

A certificate associated with a codepack can include a cryptographically signed certificate. A certificate can include information that can be used at a policy enforcement point (e.g., message broker 115 or manager 118) to determine what access to grant. Access can include a number of privileges associated with accessing the hardware 104 of computing device 102, among other types of privileges.

A management policy associated with a codepack can be used by a manager 118 to regulate the operation of the number of codepacks 112. For example, a management policy can include a policy associated with starting and/or stopping a codepack (e.g., policy that describes the conditions under which a codepack can be started and/or stopped). A management policy can define how codepacks 112 perform a number of services depending on the status of the codepacks 112 and/or the status of the user VM 110 and/or the status of the virtual workstation 114. A management policy can be altered and/or changed. For example, a manager 118 can alter and/or change a management policy associated with a codepack 112-1.

A security policy, associated with a codepack can specify the access that a codepack can have to files associated with a codepack, networking messages associated with a user VM 110, memory assigned to a user VM 110, a message broker 115, and/or virtual storage devices, among others. A security policy can be modified (e.g., by a manager 118) to grant a codepack greater access and/or to restrict the access assigned to the codepack. A baseline configuration can include the settings required to start a codepack in a default mode. Additional configurations can be added to a codepack as needed.

The CRI, requirement declaration, certificate, management policy, security policy, and/or baseline configuration associated with a codepack can be referred to generally as a configuration associated with a codepack. The configuration associated with a codepack can be managed by the codepack and a manager 118. The configurations can change dynamically based on the state of the codepacks 112, a virtual workstation 114, a user VM 110, and/or the computing device 102. For example, the configurations can indicate an access level that a codepack 112-1 can have to known external devices attached to computing device 102. For example, when an unknown device is attached to computing device 102, a codepack 112-1 can request additional configurations that determine the access level that the codepack 112-1 can have to the unknown device. A particular device can be known or unknown based on whether a codepack has configurations that grant or deny access such that the device is unknown if a codepack does not have configurations regarding the particular device. Dynamically, as referred to in association with configurations, can indicate that the configurations can be changed at a number of particular times to reflect a current state of the number of codepacks 112, a virtual workstation 114, a user VM 110, and/or the computing device 102.

A determination can be made that a particular codepack 112 does not have adequate configurations and that the codepack needs to receive additional and/or different configurations. A determination can be made by the particular codepack 112 itself and/or by a manager 118. For example, a codepack 112 can determine that it needs additional configurations and the codepack 112 can request the additional configurations (e.g., from the manager 118). The manager 118 can send the additional configurations to the codepack 112. The additional configurations can be installed by the codepack 112 and/or the manager 118.

As indicated above, a codepack can provide a number of services through an introspection library (e.g., 117). An introspection library may be included in each codepack. For instance in this example, codepack 112-1 includes introspection library 117-1, codepack 112-2 includes introspection library 117-2, codepack 112-3 includes introspection library 117-3, . . . , and codepack 112-N includes introspection library 117-N. In a number of embodiments of the present disclosure, an introspection library can be located at the VM level. For example, a first introspection library can be included in a first VM, regardless of the number of codepacks in the VM, and a second introspection library can be included in a second VM.

In a number of embodiments, the introspection library VM can be hosted in a distinct introspection VM. For example, the codepacks 112 can access an introspection library through the introspection VM, instead of including it directly.

An introspection library 117 can include CRI executed to provide access to virtual resources that are assigned to and/or associated with a user VM 110. In a number of examples, virtual resources can include memory pages that are assigned to and/or associated with the user VM 110, the network traffic associated with the user VM 110, and/or a number of virtual storage devices assigned to and/or associated with a user VM 110, among other virtual resources.

Providing access can include low-level access. Low-level access can include providing access to low-level context-free VM state, such as data stored in virtual CPU registers, memory pages, and/or virtual disk images. Providing access can further include high-level access. High-level access can include applying OS semantics to the data obtained via low-level access to provide access to high-level, OS-specific VM state, such as processes, files and/or network connections. The low-level access can allow the introspection library to obtain knowledge of the OS semantics required for the specific OS running on a user VM 110 and/or virtual workstation 114. Knowledge of the OS semantics can be obtained by gathering information from the virtual CPU registers, memory pages, and/or virtual disk images. The gathered information can allow the introspection library to determine a specific OS without requiring that a user provide that information. Having knowledge of the OS can allow an introspection library to provide a high-level interface to virtual resources that are associated with the OS.

A high-level interface can include passive and active introspection. Passive introspection can grant read access but not write access. For example, passive introspection can determine a number of processes that are running on an OS by providing read-only access to virtual resources. Active introspection can grant read/write access to virtual resources associated with the OS kernel. For example, active introspection can terminate a process (e.g., kill process) by modifying the OS kernel internals in a way that causes the OS to terminate a targeted process.

An introspection library 117 can provide access to non-resident memory associated with a user VM 110 and/or virtual workstation 114. Non-resident memory can include memory that has been swapped out to disk. Memory can be swapped out to disk when, for example, room is needed in a number of memory pages and/or when data was never read in from the disk (e.g., demand paging), among other reasons for swapping out memory to disk. An introspection library 117 can make non-resident memory available to a codepack.

In a number of embodiments of the present disclosure, the introspection library 117 can provide access to the virtual resources without communicating with the user VM 110 and/or a virtual workstation 114. Furthermore, the introspection library 117 can provide access to the virtual resources associated with the user VM 110 and/or virtual workstation 114 without communicating with the user VM 110 and/or virtual workstation 114. The codepacks 112 can provide services to the user VM 110 and/or virtual workstation 114 through the read/write access provided by the introspection library 117. For example, a codepack 112-1 can provide a virus scan service to the virtual workstation 114 by accessing a number of memory pages assigned to the virtual workstation 114 through access granted by an introspection library.

The introspection library can provide access to physical memory pages. As used herein, physical memory pages refer to memory pages that are local to a computing device 102. Physical memory pages can include memory pages that have a physical address. The introspection library can also provide access to memory pages through a virtual address and/or an OS kernel symbol, for instance. The physical memory pages can include memory pages that are assigned and/or associated with the user VM 110 and/or virtual workstation 114. For example, physical memory pages can contain code that can be scanned by a codepack 112-1 that provides virus scan services. By accessing the physical memory pages through the introspection library, and not through the user VM 110 and/or virtual workstation 114, a codepack 112-1 can ensure that the physical memory pages that the codepack 112-1 accesses have not been tampered with by malware. As used herein, contamination can refer to the presence of malware and/or other CRI that can harm a user VM 110, a virtual workstation 114, service VMs 108, and/or codepacks 112, for instance. In this context, "harm" can refer to interference with normal and/or expected execution. Harm to a user can also come in the form of misappropriation of sensitive/personal data. For example, a user can be harmed when sensitive data (e.g., bank account information) is distributed to a third party for whom the data was not intended.

An introspection library 117 can provide a number of interfaces that can be used to verify the runtime integrity of the virtual workstation 114, and/or user VM 110. The number of interfaces can allow the number of codepacks 112 to detect unexpected or modified CRI in the virtual workstation 114 and/or user VM 110. The introspection library 117 can provide a list of a number of processes running on the virtual workstation 114, for example, and/or resources associated therewith. The introspection library 117 can produce a list of the drivers loaded in a kernel that are associated with the virtual workstation 114 and/or user VM 110. The introspection library 117 can scan or monitor regions of memory, including memory associated with a specific process, driver, and/or an OS kernel. The introspection library 117 can produce a list of all open network connections and identify which process initiated each connection.

The introspection library 117 can provide a number of interfaces that can be used to perform file system integrity checks and virus scanning. The introspection library 117 can grant access to raw disk sectors that comprise the virtual disk image used by the user VM 110 and/or virtual workstation 114. The introspection library 117 can grant access to the filesystem on the virtual disk image used by the user VM 110 and/or virtual workstation 114. The introspection library 117 can grant access to OS configuration data stored in a filesystem. OS configuration data can be, for instance, a Microsoft Windows OS registry. The introspection library 117 can perform the above mentioned functions by applying OS semantics to VM states obtained from physical memory pages and/or a number of virtual storage devices, for instance.

The introspection library 117 can provide a number of interfaces for indirectly managing an OS and applications in the virtual workstation 114 and/or user VM 110. An introspection library can kill (e.g. terminate) a number of processes running on a virtual workstation 114. For example, a codepack 112-1 can access the physical memory pages and/or virtual storage devices associated with a virtual workstation 114 through an introspection library. The access can be granted on a read and write basis, for example. The codepack 112-1 and/or the introspection library can read the physical memory pages and/or the virtual storage devices to locate a process with a specific process identifier (PID) and can terminate the process through a write access by directly modifying VM memory. In a number of embodiments of the present disclosure, the introspection library 117 can provide more or fewer functions to a codepack 112.

The introspection library 117 can allow a codepack 112 to access data associated with a user VM 110 and/or a virtual workstation 114 without requiring that an agent (e.g., a virtual workstation agent) be located within the user VM 110 and/or the virtual workstation 114. An agent can include CRI that can be executed to allow a codepack 112 to communicate with a user VM 110 and/or a virtual workstation 114. An agentless approach to providing a number of services can allow a codepack 112 to provide a number of services to the user VM 110 and/or virtual workstation 114 without interacting with the untrusted OS or applications running in the virtual workstation 114 and/or user VM 110.

The introspection library 117 can allow a codepack 112 to access data associated with a user VM 110 and/or a virtual workstation 114 regardless of a specific software configuration associated with the user VM 110 and/or the virtual workstation 114. For example, a codepack 112 can provide a number of services to a virtual workstation 114 regardless of a specific OS associated with the virtual workstation 114 without requiring that the codepack 112 be modified to communicate with the specific OS. This infrastructure can allow third party codepacks to provide services without requiring that the third party codepacks be configured to communicate with a specific OS. As used herein, third party codepacks can include codepacks that are created by a third party to function with a number of different OSs.

An introspection library 117 can include generic introspection logic and specific introspection logic. Specific introspection logic can include logic that is specific to an OS. Logic can be specific to an OS when it is designed to work with a specific OS. Generic introspection logic can include logic that is designed to work with a number of OSs. An introspection library 117 can include a collection of OS modules that describes the details of a specific OS. Details of a specific OS can include structure definitions and/or layout of structures in memory that are associated with a specific OS.

An introspection library 117 can determine what introspection logic to use depending on an OS that is associated with a user VM 110 and/or virtual workstation 114. For example, an introspection library 117 can determine based on an OS fingerprint which version of an OS is running in the user VM 110. The introspection library 117 can augment generic introspection logic at runtime with specific introspection logic based on the particular version of the OS running in the user VM 110. An OS fingerprint can include OS version information stored in memory and/or virtual disk images associated with the user VM 110 and obtainable via introspection.

An introspection library 117 can grant a number of codepacks 112 different accesses to virtual resources associated with a user VM 110 and/or a virtual workstation 114. For example, a first codepack 112-1 can be granted access to a number of memory pages while a second codepack 112-2 can be granted access to network traffic.

Additionally, each user VM can have an associated introspection library and/or introspection VM. For example, a first user VM can have an associated first introspection library and a second user VM can have a second introspection library. The first introspection library can grant access to the virtual resources associated with the first user VM and the second introspection library can grant access to the virtual resources associated with the second user VM. Assigning each user VM a different introspection library can limit the access that codepacks 112 have to each user VM. For example, a first group of codepacks can be granted access to the first user VM and not the second user VM while a second group of codepacks can be granted access to the second user VM and not the first user VM.

In a number of embodiments of the present disclosure, each of a number of codepacks 112 can provide a number of services. For example, a number of codepacks 112 can provide authentication services, firewall services, proxy (e.g., hypertext transfer protocol (HTTP) proxy) services, integrity monitoring services, orchestration services, intrusion detection services, process monitoring services, user reporting services, user VM watchdog services, and/or virus scan services, among others.

For instance, the number of codepacks 112 can include an authentication module (e.g., authentication codepack) that can provide authentication services. An authentication codepack, for example, can monitor a number of smartcard readers and notify other codepacks via the communication channel 116 when a card has been authenticated and/or removed. A smartcard can be a form of identification that identifies a user that is associated with a virtual workstation 114. A number of codepacks 112 can modify their configurations based on the status of a user identity as authenticated by an authentication codepack. A smartcard reader can remain under the control of the authentication codepack and may remain invisible to a user VM 110 and/or a virtual workstation 114 which can limit the exposure that a smartcard reader can have to malware.

The number of codepacks 112 can include a firewall module (e.g., firewall codepack) that can provide firewall services. A firewall codepack can be interposed between a computing device 102 and a network interface. A firewall codepack can regulate network traffic through the use of filters such as iptables and/or ebtables. The regulation of network traffic can occur based on a policy that can be changed to correspond to an authenticated user and/or a threat level. The firewall codepack can alert a number of codepacks 112 when the firewall codepack detects a policy violation and/or a potential policy violation.

The number of codepacks 112 can include a proxy codepack that can provide proxy services. A proxy codepack can filter a number of service requests associated with a user VM 110 and/or a virtual workstation 114 based on a service policy. A proxy codepack can rewrite transactions that are classified as dangerous and/or malformed during the filtering. A proxy codepack can also send a number of alerts to a number of codepacks 112 based on the filtering and rewriting.

The number of codepacks 112 can include an integrity monitor module (e.g., integrity monitor codepack) that can perform integrity checks of files and disk sectors in a number of virtual storage devices that can be associated with a user VM 110 and/or a virtual workstation 114. An integrity monitor codepack can also report discrepancies discovered during the integrity checks. An integrity monitor codepack can monitor the integrity of Windows system files, executable object files, registry keys and boot records, for instance.

The number of codepacks 112 can include a malware police module (e.g., malware police codepack) that can orchestrate the activities of the codepacks 112. For instance, a malware police codepack can orchestrate the activities of the codepacks 112 in cases in which the codepacks 112 are providing a number of services in an orchestrated manner.

The number of codepacks 112 can include a network intrusion detection system (NIDS) module (e.g., NIDS codepack) that can examine outbound network traffic from the user VM 110 and/or the virtual workstation 114. The NIDS codepack can examine outbound network traffic to detect network attacks and/or their precursors (e.g., suspicious behavior). For example, outbound network traffic can be examined to detect scanning behavior that can be associated with a worm. The NIDS codepack can alert the other codepacks 112 when a network attack is detected and/or when suspicious behavior is detected.

The number of codepacks 112 can include a process monitor module (e.g., process monitor codepack) that can gather information about running processes associated with a user VM 110 and/or a virtual workstation 114. The information gathered can include information about a specific process and/or information about a number of running processes that can be associated with a specific activity. For example, an activity can include network activity, such as use of a specific resource, such that a process monitor codepack can gather information about all processes that are using the resource.

A number of codepacks 112 can include a user reporting module (e.g., user reporting codepack) that can relay a number of messages directly to a user. For example, a user reporting codepack can relay a number of messages directly to a human user without communicating with the virtual workstation 114 and/or user VM 110. The message can be relayed to the user through an instant messaging service, a window on the main display, a private audio device used to generate synthesized speech from the message, and/or an integrated display on a smartcard reader, among others. Communicating a message to a human user through a window on the main display can include writing directly to the graphics hardware for the main display and/or introducing a process into the user VM 110 that can create a display without communicating with the virtual workstation 114 and/or user VM 110, among other methods for communicating a message to a human user.

The number of codepacks 112 can include a user VM watchdog module (e.g., user VM watchdog codepack) that can start a user VM 110 during a system boot. A user VM watchdog codepack can also restart a user VM 110 and can notify a manager 118 when the user VM 110 restarts, shuts down, and/or crashes. A user VM watchdog codepack can attach and/or detach a number of peripheral devices. The attachment and/or detachment of a number of peripheral devices can be contingent on an authentication of a user. For example, a number of peripheral devices can be attached when a user is successfully authenticated and can be detached when no user is authenticated. A user VM watchdog can notify a manager 118 of the status of a number of peripheral devices.

The number of codepacks 112 can include a virus scan module (e.g., virus scan codepack) that can inspect selected files and/or devices for known virus signatures. A virus scan codepack can inspect files and/or devices that are peripherally attached to a computing device 102 and associated with a user VM 110 and/or a virtual workstation 114. For example, a virus scan codepack can inspect files located on a USB storage device before making it available to a user VM 110. A report of an inspection can be sent to other codepacks and/or to a manager 118.

The number of codepacks 112 can operate in an independent manner to provide a number of services to a user VM 110 and/or a virtual workstation 114. The codepacks 112 can operate in an orchestrated manner and/or in a collaborative manner.

In a number of embodiments of the present disclosure, the number of codepacks 112 can perform a collaborative operation to provide a number of services. A collaborative operation can include the number of codepacks 112 working in collaboration while independently providing a number of services and informing the other codepacks 112 of the number of services independently provided. For example, a first codepack 112-1 can send an alert to a number of other codepacks 112. The number of other codepacks 112 can determine how the alert is to be interpreted (e.g., based on its configurations) and/or an action that should be taken in response to the alert. A second codepack 112-2 may ignore the alert while a third codepack 112-3 may determine that a specific action is required in response to the alert.

An orchestrated operation of a number of codepacks can include an orchestration codepack (e.g., a malware police codepack) that can receive a number of messages (e.g., alerts)

and that can orchestrate a response to the number of messages. The orchestration codepack can orchestrate a response to the number of messages by communicating the number of messages to the number of codepacks 112. For example, an orchestration codepack can receive an alert that a virus has been detected in a virtual workstation 114 and the orchestration codepack can determine an appropriate response to the alert. The orchestration codepack can initiate an appropriate response by sending a number of messages to the number of codepacks 112 wherein the number of messages are associated with the alert. The appropriate response can then be carried out by the number of codepacks 112. As such, the services that are provided to the user VM 110 and/or virtual workstation 114 can be orchestrated by one or more of the number of codepacks 112.

Figure 2:
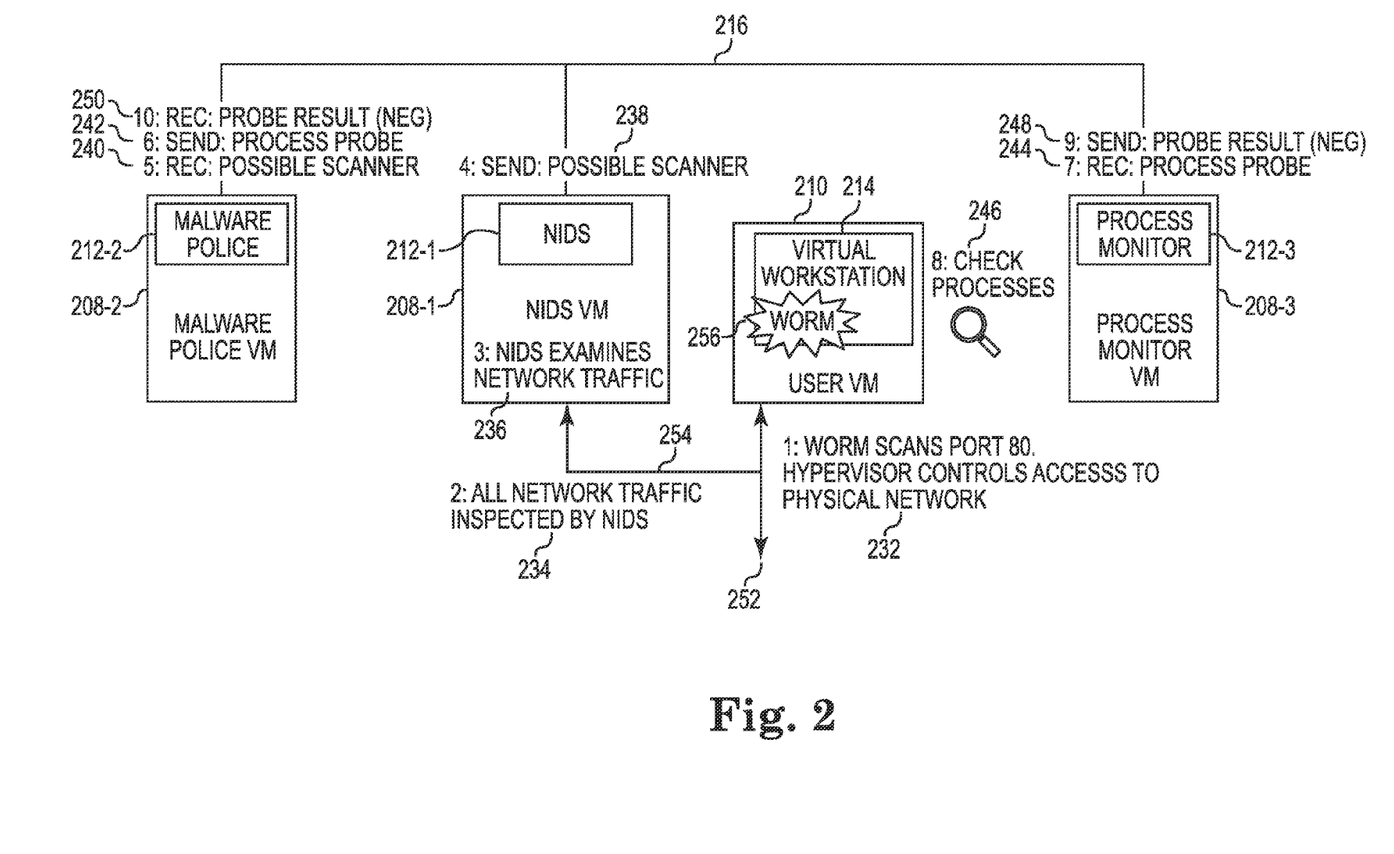
FIG. 2 illustrates a functional block diagram associated with providing VM services in accordance with a number of embodiments of the present disclosure.

FIG. 2 illustrates a functional block diagram associated with providing VM services in accordance with a number of embodiments of the present disclosure. The embodiment of FIG. 2 illustrates detection of malware on a virtual workstation 214. FIG. 2 includes a user VM 210 which can be analogous to user VM 110 in FIG. 1, and a virtual workstation 214 which can be analogous to virtual workstation 114 in FIG. 1. In the embodiment of FIG. 2, the virtual workstation 214 includes a worm 256. Worm 256 can spread by scanning through a number of network addresses and by sending a copy of the worm 256 to one or more of a number of service VMs (e.g., service VMs 108 shown in FIG. 1) and/or computing devices (e.g., computing device 102 shown in FIG. 1).

In the embodiment illustrated in FIG. 2, the worm 256 can send a number of requests (e.g., as shown at 232) through a physical network 252 connected to user VM 210 (e.g., as indicated by arrow 252). A NIDS codepack 212-1 residing on a NIDS VM 208-1 can intercept the network traffic (e.g., as indicated by arrow 254). The NIDS codepack 212-1 can intercept the network traffic without being connected to and/or communicating with the user VM 210 and/or the virtual workstation 214. The NIDS codepack 212-1 can intercept network traffic through special privileges that can be granted by a virtual machine monitor (e.g., virtual machine monitor 106 shown in FIG. 1). As shown at 234, the NIDS codepack 212-1 can inspect the network traffic. At 236, the NIDS codepack 212-1 can examine the network traffic and can determine whether a security threat may be associated with the network traffic (e.g., by determining whether the traffic exhibits scanning behavior). For instance, the NIDS 212-1 can identify that network traffic is abnormal.

In a number of embodiments of the present disclosure, a NIDS codepack 212-1, which is working in collaboration with a process monitor codepack 212-3, can send an alert directly to the process monitor codepack 212-3 (e.g., in response to the examined network traffic). The process monitor codepack 212-3 can decide whether to take an action in response to the alert.

In FIG. 2, a number of services offered by the NIDS codepack 212-1 and the process monitor codepack 212-3 can be orchestrated by a particular service VM (e.g., a malware police codepack 212-2 in a malware police VM 208-2 in this example). At 238, the NIDS codepack 212-1 can send an alert to the malware police codepack 212-2. In this example, the alert can indicate the detection of possible scanning behavior (e.g., based on the examination of the network traffic by the NIDS VM). At 240, the malware police codepack 212-2 receives the NIDS codepack alert. The malware police codepack 212-2 can analyze the alert and, based on a policy internal to the malware police codepack 212-2, classify the behavior that the alert is reporting. For example, the behavior can be classified as suspicious and/or as an attack, among other classifications. For example, if the network traffic is destined for port 80, then the malware police codepack 212-2 can classify the behavior as suspicious because port 80 can also be used for legitimate network traffic.

The malware police codepack 212-2 can take action to determine, in response to receiving the alert, if the behavior is legitimate network traffic or scanning behavior of a worm, for example. Legitimate network traffic can include traffic through a network that does not affect the operation of the virtual workstation 214, the user VM 210, and/or other VMs. In determining whether there is legitimate network traffic on port 80, for example, the malware police codepack 212-2 can issue a process probe request 242 via a communication channel 216 to determine if a web browser is running in the user VM 210 and/or the virtual workstation 214.

At 244, the process probe request 242 can be received by the process monitor codepack 212-3 that can be contained in a process monitor VM 208-3. At 246, the process monitor codepack 212-3 can observe a number of processes running in the user VM 210 and/or the virtual workstation 214 (e.g., to determine if a web browser is running). The observations can be done through an introspection library (e.g., introspection library 117 described in connection with FIG. 1). For example, the process monitor codepack 212-3 can request a number of running processes from the introspection library. The introspection library can determine, via high-level introspection access, which processes are running. The introspection library can provide a list of the running processes along with associated data to the process monitor codepack 212-3. The process monitor codepack 212-3 can determine, for example, whether the running processes are a legitimate source of the detected scanning behavior. In this embodiment, at 248, the process monitor codepack 212-3 sends a reply to the malware police codepack 212-2 indicating that there is no legitimate source of the scanning behavior (e.g., a negative reply).

At 250, the malware police codepack 212-2 receives the reply. The malware police codepack 212-2 can interpret the reply as confirmation that the network behavior is malicious scanning behavior (e.g., in response to the negative reply from codepack 212-3). The malware police codepack 212-2 can orchestrate a number of actions through a number of codepacks in response to the confirmation of malicious scanning behavior. For example, the malware police codepack 212-2 can change a threat level associated with a user VM 210 and/or the virtual workstation 214. The malware police codepack 212-2 can also quarantine the user VM 210 and/or the virtual workstation 214 from the rest of the network.

Figure 3:
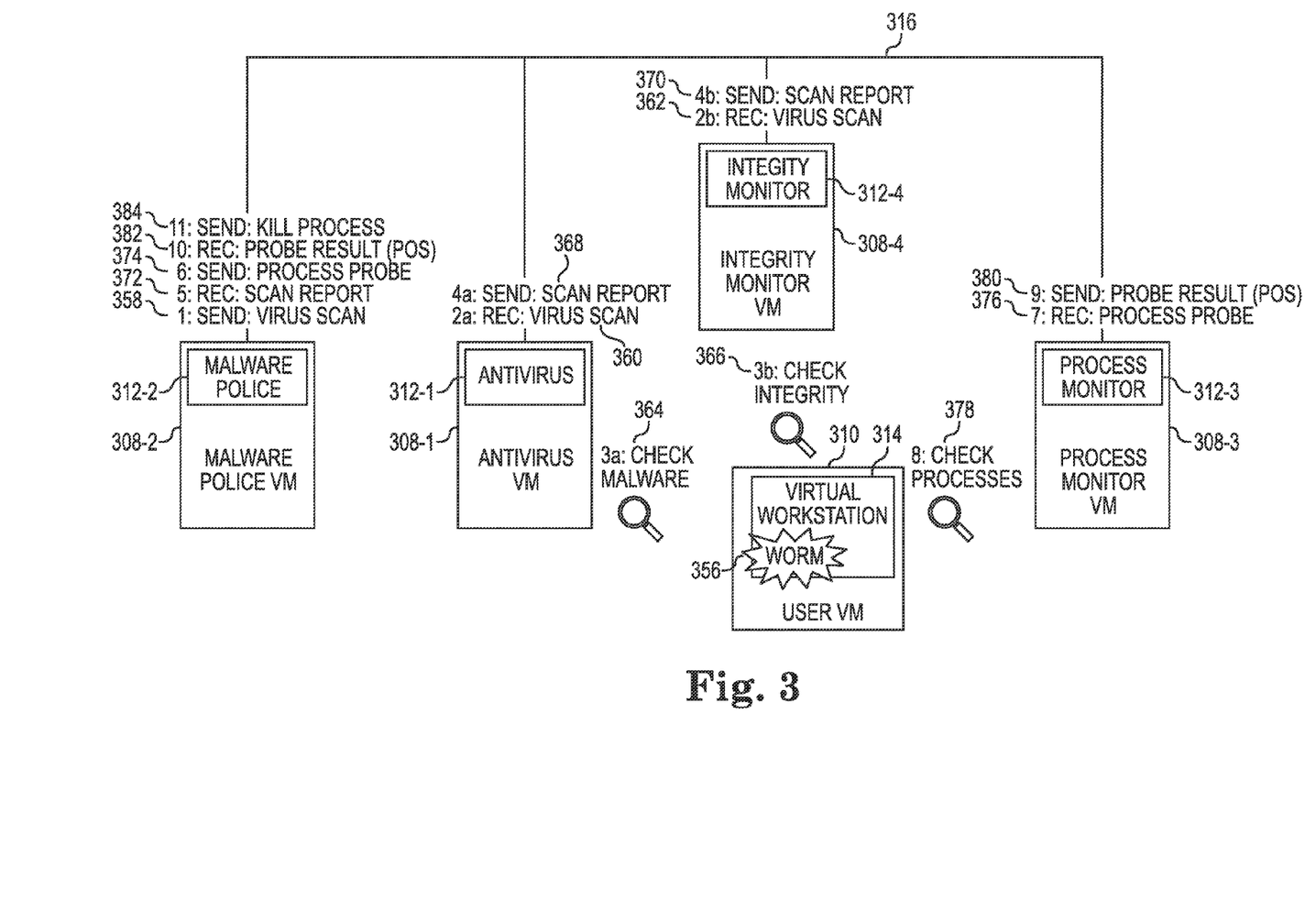
FIG. 3 illustrates a functional block diagram associated with providing VM services in accordance with a number of embodiments of the present disclosure.

FIG. 3 illustrates a functional block diagram associated with providing VM services in accordance with a number of embodiments of the present disclosure. The embodiment of FIG. 3 illustrates a reaction to malware on a user VM. FIG. 3 includes a user VM 310, which can be analogous to a user VM 210 in FIG. 2, and a virtual workstation 314, which can be analogous to a virtual workstation 214 in FIG. 2, with a worm 356, which can be analogous to a worm 256 in FIG. 2.

A malware police codepack 312-2 (e.g., analogous to a malware police codepack 212-2 in FIG. 2) in a malware police VM 308-2 (e.g., analogous to a malware police VM 202-2 in FIG. 2) can react to a worm 356. In this embodiment, the malware police codepack 312-2 reacts by orchestrating a number of services that a number of codepacks perform to secure a virtual workstation 314 and/or a user VM 310. For example, at 358, malware police codepack 312-2 issues a virus scan request for a user VM file system to an antivirus codepack 312-1 in an antivirus VM 308-1 and an integrity monitor codepack 312-4 in an integrity monitor VM 308-4.

The virus scan request can be delivered through a communication channel 316 (e.g., analogous to communication channel 216 in FIG. 2).

At 360 and 362, an antivirus codepack 312-1 and an integrity monitor codepack 312-4, respectively, receive the requests from the malware police codepack 312-2. At 364, the antivirus codepack 312-1 searches for malware in the user VM file system through an introspection library (e.g., introspection library 117 in FIG. 1). At 366, the monitor codepack 312-4 examines running processes against a previously established signature for each process. At 368 and 370, scanning reports are sent to the malware police codepack 312-2 with the results of the antivirus codepack 312-1 search and the integrity monitor codepack 312-4 examination. The reports can include malware files found by the antivirus codepack 312-1 and/or discrepancies between processes found and previously established process signatures, for example.

At 372, the malware police 312-2 receives the reports. At 374, the malware police 312-2 issues a process probe request, in response to the reports, to the process monitor codepack 312-3 that can be in a process monitor VM 308-3 to determine if the malware files and/or the processes with discrepancies are running in the user VM 310 and/or the virtual workstation 314. At 376, the process monitor codepack 312-3 (e.g., analogous to a process monitor codepack 212-3) receives the process probe request. At 378, the process monitor codepack 312-3 examines the user VM 310 and/or virtual workstation 314 for running processes through an introspection library. If the process monitor codepack 312-3 determines that a malware process and/or a process with discrepancies is running on the user VM 310 and/or the virtual workstation 314, then the process monitor codepack 312-3 can reply, at 380, with a positive process probe response to the malware police 312-2, with the positive reply indicating that malware was found running on the user VM 310 and/or the virtual workstation 314.

At 382, the malware police codepack 312-2 receives the positive process probe response. At 384, the malware police issues a kill process command to terminate the offending process. The introspection library can be used to terminate the offending process.

Embodiments of the present disclosure are not limited to the examples described in FIGS. 2 and 3. For instance, embodiments are not limited to instances of malware, etc. The figures are illustrative and can be adapted to provide various embodiments of orchestration, collaboration, and/or independent approaches, among other embodiments.

Figure 4:
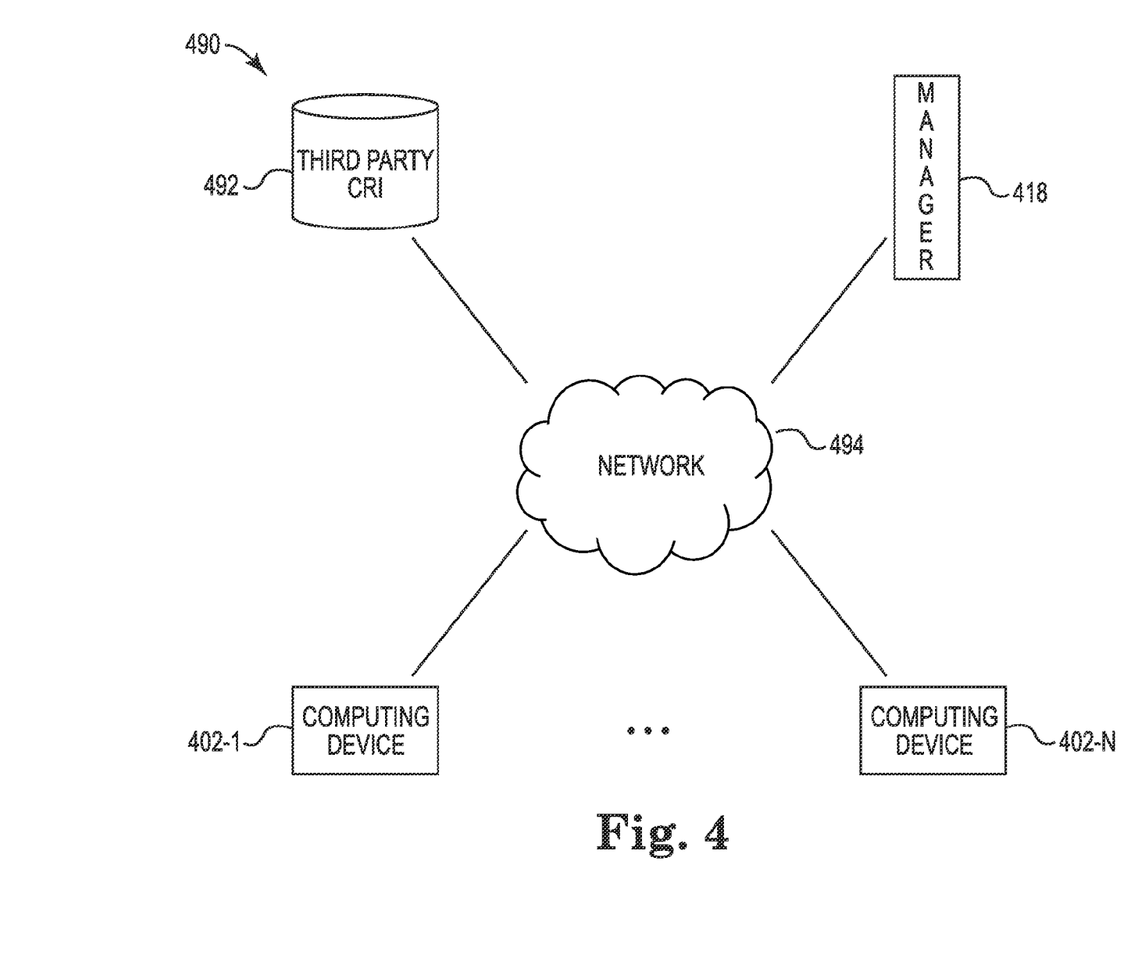
FIG. 4 illustrates a system for providing VM services in accordance with a number of embodiments of the present disclosure.

FIG. 4 illustrates a system 490 for providing VM services in accordance with a number of embodiments of the present disclosure. The embodiment of FIG. 4 illustrates a source of the third party CRI. FIG. 4 includes a manager 418, which can be analogous to a manager 118 in FIG. 1, a number of computing devices 402-1, . . . , 402-N (e.g., referred to generally as 402), which can be analogous to a computing device 102 in FIG. 1, a network 494, and a database 492.

In the embodiment of FIG. 4, the database 492, manager 418, and/or computing devices 402 can be connected through a network 494 which can be a communication channel. For example, a manager 418 can update a number of codepacks (e.g., codepacks 112) in the computing devices 402 with sets of third party CRIs from a database 492 which serves as a source of sets of third party CRIs. The sets of third party CRIs can be analogous to the sets of third party CRIs as described above in connection with FIG. 1. The update can occur through the network 494, for example.

CONCLUSION

The present disclosure includes methods and systems for providing virtual machine services. A number of embodiments can include a user VM with a virtual workstation, a number of service modules that can provide a number of services without communicating with the user VM and/or the virtual workstation, a communication channel that allows the number of service modules to communicate with each other, a computing device, and a manager. A number of embodiments can also include a virtual machine monitor to enforce an isolation policy within the system.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. As used herein, the term "and/or" includes any and all combinations of a number of associated listed items.

It will be understood that, although the terms first, second, etc. may be used herein to describe various elements and that these elements should not be limited by these terms. These terms are only used to distinguish one element from another element. Thus, a first element could be termed a second element without departing from the teachings of the present disclosure.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one.

Combination of the above embodiments, and other embodiments not specifically described herein will be apparent to those of skill in the art upon reviewing the above description. The scope of the number of embodiments of the present disclosure includes other applications in which the above structures and methods are used. Therefore, the scope of the number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer implemented method for providing virtual machine services, the method comprising:
   providing a user virtual machine (VM) having access to a number of virtual resources;
   providing a number of service VMs having a number of service modules that provide a number of services to the user VM by accessing the virtual resources, wherein each of the number of service modules includes:
   a requirements declaration that describes resources required by a corresponding service module;
   a cryptographically signed certificate that allows the corresponding service module to access the number of virtual resources which includes a number of memory pages, network traffic, and a number of virtual storage devices associated with the user VM;

a management policy that is used to regulate each of the number of service modules;

a security policy that specifies an access that the corresponding service module can have to the number of memory pages, the network traffic, and the number of virtual storage devices;

a baseline configuration that establishes settings required to start the corresponding service module in a default mode; and isolating the user VM from the number of service VMs through a virtual machine monitor that prevents communication between the user VM and the number of service VMs.

2. The method of claim 1, including accessing the number of virtual resources through an introspection library, wherein the introspection library provides direct access to the virtual resources without communicating with an agent that is in the user VM and without communicating with the user VM.

3. The method of claim 2, including providing the number of services to the user VM via a read and write access to the number of virtual resources that are provided to the number of service VMs by the introspection library.

4. The method of claim 2, wherein accessing the number of virtual resources without communicating with the user VM includes accessing a number of memory pages, network traffic, and a number of virtual storage devices associated with the user VM.

5. The method of claim 1, wherein isolating the user VM from the number of service VMs through the virtual machine monitor includes creating a barrier that prevents malware from crossing from the user VM into the number of service VMs.

6. A system for providing virtual machine services, comprising:

a first computing device including processor and memory resources and a virtual machine monitor configured to enforce an isolation policy between a number of virtual machines (VM);

a user VM that allows a user to access a number of virtual resources;

a number of service modules within a number of service VMs, wherein each of the number of service modules includes:

instructions executed to provide security related services;

an authentication mechanism that is used to uniquely identify each of the service modules and an associated security policy;

a management policy that regulates the operation of the corresponding service module;

the security policy that specifies an access that the corresponding service module has to the virtual resources;

a communication channel that allows the number of service modules to communicate with each other, wherein the number of service modules and the number of service VMs are isolated from the user VM through the communication channel and through the isolation policy enforced by the virtual machine monitor; and a management module within a management VM that allows a manager to communicate with the number of service modules and the number of service VMs, wherein the management VM is isolated from the user VM and wherein the manager modifies and updates the management policy and the security policy in each of the number of service VMs.

7. The system of claim 6, further comprising a second computing device including the management module and the management VM.

8. The system of claim 7, wherein the management module manages the number of service modules in a number of computing devices including the first computing device, with each of the number of computing devices having a number of user VMs that are isolated from the management module and the number of service modules.

9. The system of claim 6, further comprising a message broker that restricts access to the communication channel based on an identification assigned to each of the number of service modules by an authentication mechanism.

10. The system of claim 9, wherein the communication channel connects the message broker with the management VM and wherein the management VM records a log of traffic that passes through the message broker.

11. A system for providing virtual machine services, comprising:

a first computing device including processor and memory resources and a virtual machine monitor configured to enforce an isolation policy between a number of virtual machines (VM);

a user VM that allows a user to access a number of virtual resources;

a number of service modules within a number of service VMs, wherein each of the number of service modules includes:

instructions executed to provide security related services;

an authentication mechanism that is used to uniquely identify each of the service modules and an associated security policy;

a management policy that regulates the operation of the corresponding service module;

the security policy that specifies an access that the corresponding service module has to the virtual resources;

a communication channel that allows the number of service modules to communicate with each other, wherein the number of service modules and the number of service VMs are isolated from the user VM through the communication channel and through the isolation policy enforced by the virtual machine monitor;

a management module within a management VM that allows a manager to communicate with the number of service modules and the number of service VMs, wherein the management VM is isolated from the user VM; and a message broker that restricts access to the communication channel based on an identification assigned to each of the number of service modules by an authentication mechanism.

12. The system of claim 11, further comprising a second computing device including the management module and the management VM.

13. The system of claim 12, wherein the management module manages the number of service modules in a number of computing devices including the first computing device, with each of the number of computing devices having a number of user VMs that are isolated from the management module and the number of service modules.

14. The system of claim 11, wherein the manager modifies and updates the management policy and the security policy in each of the number of service VMs.

15. The system of claim 11, wherein the communication channel connects the message broker with the management VM and wherein the management VM records a log of traffic that passes through the message broker.

* * * * *